United States Patent

Speich

[15] 3,688,081
[45] Aug. 29, 1972

[54] CLEAR VIEWING SCREENS
[72] Inventor: Pier Gianni Speich, 7/C Via Domenico Chiodo, Genoa, Italy
[22] Filed: Nov. 9, 1970
[21] Appl. No.: 87,766

[30] Foreign Application Priority Data

Nov. 12, 1969 Italy........................7439 A/69

[52] U.S. Cl. .................219/203, 15/250.05, 52/171, 219/522, 350/62
[51] Int. Cl. ..........................E06b 3/12, H05b 3/00
[58] Field of Search ......350/61, 62, 63; 52/171, 172; 296/84 H; 219/203, 522; 15/250.05

[56] References Cited

UNITED STATES PATENTS

| | | | |
|---|---|---|---|
| 2,383,750 | 8/1945 | Smith | 52/171 |
| 1,378,604 | 5/1921 | Murphy | 219/203 X |
| 3,188,700 | 6/1965 | Herrmann et al. | 52/171 |
| 3,347,004 | 10/1967 | Allen | 52/171 |
| 3,429,086 | 2/1969 | Speich | 52/171 |
| 3,495,366 | 2/1970 | Allen | 350/62 UX |
| 3,045,551 | 7/1962 | Bonanno | 350/62 |

FOREIGN PATENTS OR APPLICATIONS 900,916  7/1962  Great Britain...............52/171

Primary Examiner—A. Bartis
Attorney—Edwin E. Greigg

[57] ABSTRACT

A clear viewing screen for vehicles, particularly for vehicles which have to operate under polar conditions, comprising a fixed screen element, a rotatable disc like screen element mounted in front of the said fixed screen element with the interposition of a labyrinth joint at the periphery of the said rotatable screen element, a motor for driving the said rotatable screen element, a motor for driving the said rotatable screen element, and electric heating elements in the chamber between the fixed screen element and the rotatable screen element. Means are also provided on the outer surface of the rotatable screen element for breaking the ice crusts formed on said screen element, and operated by the rotatable screen element driving motor.

5 Claims, 2 Drawing Figures

INVENTOR
Pier G. Speich
BY Edwin E. Gregg
ATTORNEY

CLEAR VIEWING SCREENS

BACKGROUND OF THE INVENTION

This invention relates to clear viewing screens for vehicles, and particularly for ships, motor boats, air planes and other vehicles, which comprises two parallel screen elements of transparent material, one of which is rotatable so as to throw off, by centrifugal action, any water or other material which might otherwise accumulate thereon.

The invention is an improvement over existing clear viewing screens of this kind and aims to provide means for preventing the formation of, and for eliminating the ice crusts from the said rotatable screen element, which may form on said screen whenever same is exposed to very low temperatures, as may for instance be the case in vessels exposed to polar conditions or the like.

SUMMARY OF THE INVENTION

According to the invention, a clear viewing screen of the type described is characterized in that in the space between the rotatable screen element and the fixed screen element at least one annular electric heating element is disposed. The said heating element is advantageously disposed centrally around the axle of the rotatable screen element. A second heating element may be also provided, in the space between the rotatable screen element and the fixed screen element, in the outer peripheral zone of the said space.

According to a further improvement of the invention, means may be provided, operated by the same electric motor driving the rotatable screen element, for breaking the ice crusts formed on the external side of the rotatable screen element. According to one preferred embodiment of the invention, the said means are in the form of a cap reciprocated relative to the outer surface of the rotatable screen element by arms slidable along the outer surface of the rotatable screen, and operated through a cam transmission by the shaft of the rotatable screen driving motor.

Further improvements and characteristic features of the invention will be apparent from the following specification and will be pointed out in the appended claims.

DESCRIPTION OF THE PREFERRED EMBODIMENT

Figure 1:
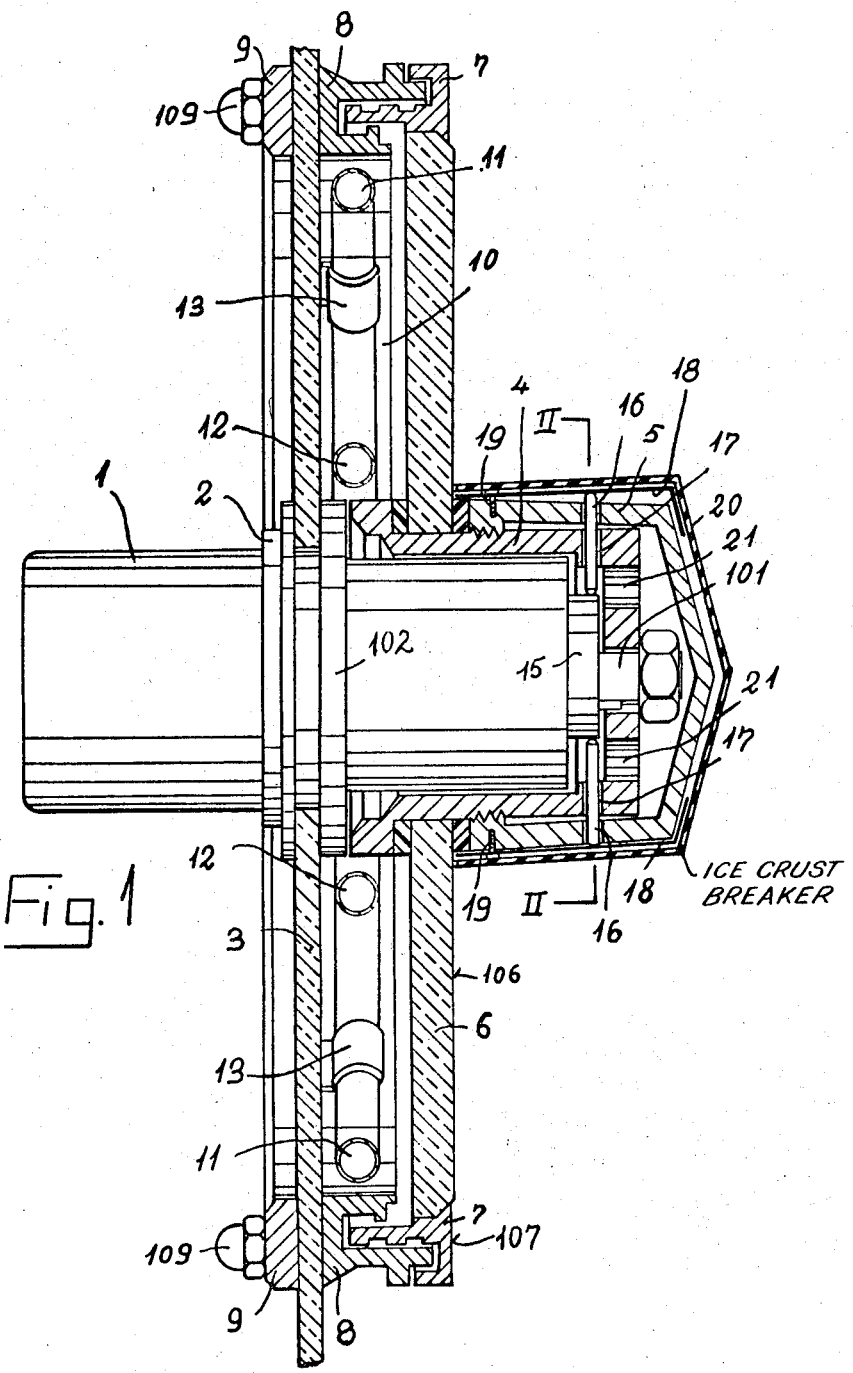
FIG. 1 is a cross-sectional side elevation showing the clear viewing screen of the invention in position in a windscreen.
Figure 2:
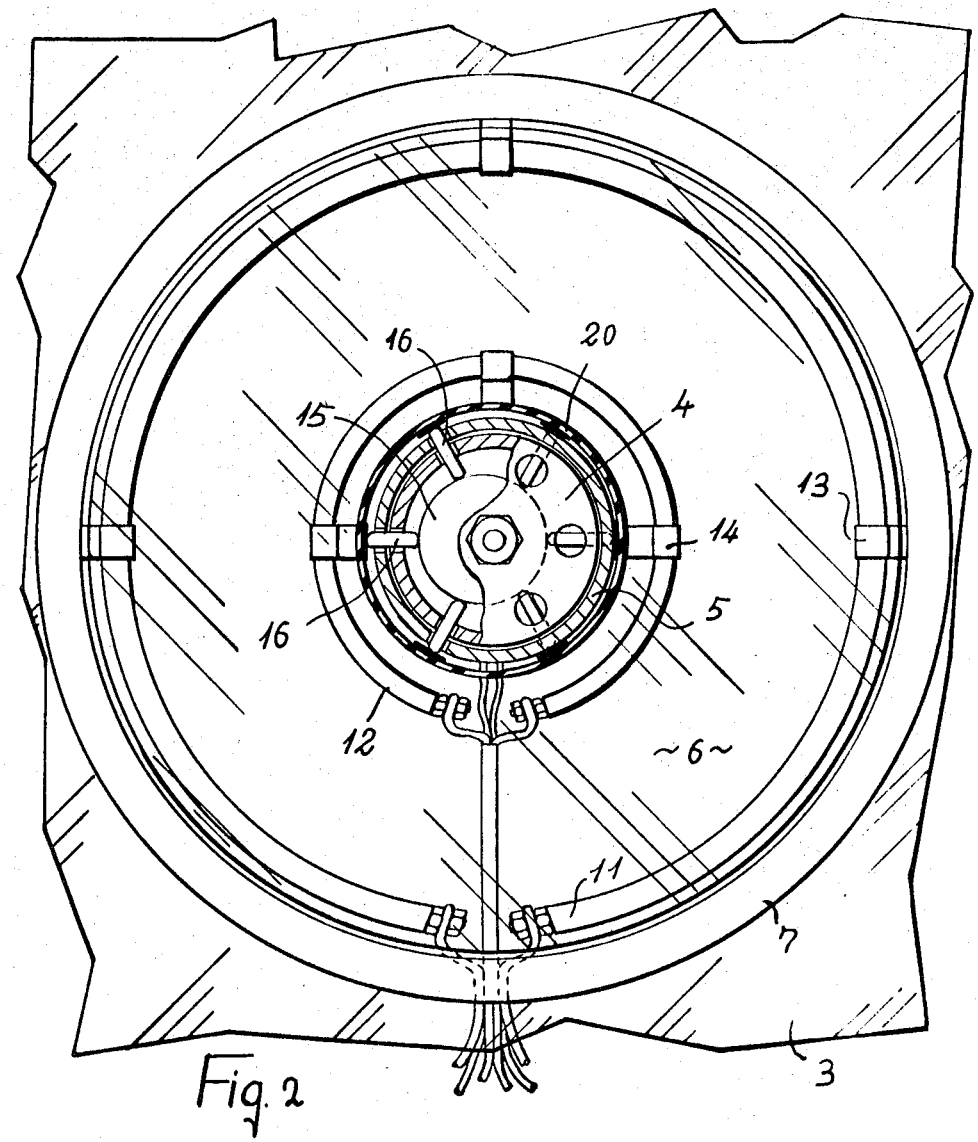
FIG. 2 is a front view of the clear viewing screen of FIG. 1, with parts broken away.

With reference to the figures of the drawings, 3 is a windshield glass section of a vehicle, in front of the pilot or the driver.

In front of the said windshield section 3, a centrally perforated transparent disc 6 is rotatably mounted by being inserted upon, and fastened by means of a sleeve 5 to a bell shaped extension 4 of the shaft 101 of an electric motor 1 mounted in a hole of the window glass 3. To this end, the motor casing 1 is provided with an abutment collar 102 and is inserted into the glass hole by its end opposite to the motor shaft until said abutment 102 abuts against said glass 3. The motor 1 is fastened to the windshield by means of a conventional screw-threaded locking ring 2.

The disc 6 is provided at its periphery with a substantially U-shaped rim 7 forming a rotatable member of a labyrinth joint whose wings engage in corresponding annular recesses of the complementary fixed labyrinth joint member 8 fastened by means of an annular flange 9 and bolts 109 in a corresponding position to the glass 3. This assembly is so constructed and arranged as to form between glass 3 and disc 6 a gap or chamber 10 closed at its periphery by a labyrinth joint and at its outer side by a disc 6, which may be rapidly rotated by the motor shaft 101, thus eliminating by centrifugation any condensate, brine or splash water which may come into contact therewith.

The problem arises in clear viewing screens of the kind described whenever same have to be used under very low temperature conditions, such as it may be encountered in arctic regions, causing the water which may come into contact with the said screens to rapidly freeze in form of an ice crust adhering to the rotatable screen element, which crust may not be throw off by simply centrifugation.

According to the invention, in the chamber 10 an electric heating element in the form of an annular element 12 is disposed centrally of the chamber, around the motor casing 1. The heating element 12 is secured in place by means of securing members 14 to the abutment member 102.

A second annular electric heating element 11 is also disposed in chamber 10, at the outer periphery of said chamber 10, and is secured by means of the securing members 13. The said two heating elements are disposed so as to not interfere with the visual field through the clear viewing screen. The said heating elements are connected, through suitable electrical leads to a source of current, not shown.

The heating of the electrical heating elements promotes the detachment of the ice crust from the screen 6, so that same may be easily throw off by centrifugal action.

In order to facilitate the slipping of the ice crusts from the surface of the rotatable screen element 6, the outer surface 107 of the peripheral rim 7 is slightly stepped down with respect to the outer surface 106 of the screen element 6.

According to a further feature of the invention, means are provided for breaking the ice crust adhering to the outer surface of the screen element 6. To this end, around the sleeve 5 a number of radially extending arms 18 are provided, these arms each being provided at one end with a pin 19 slidably engaged into a corresponding hole formed in the sleeve 5. A cam like member 15 is secured to the fixed motor casing 1, and cooperates with a number of pins 16, slidably guided into a corresponding number of holes bored through the bell shaped extension 4 and the sleeve 5, in a position corresponding to the arms 18.

A cap 20, made of insulating elastic material, like plastic material is arranged on the sleeve 5, above arms 18.

In this manner, upon rotation of motor shaft 101, the pins 16 are entrained into rotation by bell 4 and sleeve 5, and are caused to slide inside of borings 17 by the action of the cam 15. In this manner the movement of the pins 16 is transmitted to the arms 18, and therefrom to the cap flexible 20, thus providing for flexing of the cap for the breakage of the ice crusts adhering to the surface 106 of the screen element 6. It is believed to be clear that the arms 18 deflect the terminus of the wall of the cap back and forth so that the ice fracturing action is thereby achieved.

Thus, it will be seen that the utility is further enhanced by the ice fracturing means.

The invention is not restricted to the embodiment described above, and permits of several, structurally different solutions without departing from its principle.

What I claim is:

1. A clear viewing screen of the kind comprising a fixed screen element, a rotatable disc like screen element, a joint member between said fixed screen element and the periphery of said rotatable screen element defining a chamber between said two screen elements and said joint member, an electric motor having its shaft connected to said rotatable disc screen element, for driving said disc screen element, electric heating means in the chamber between said two screen elements, and means reciprocated relative to the outer surface of the rotatable screen by the said electric motor driving the rotatable screen element for breaking the ice crusts which might be formed on the outer surface of said rotatable screen element.

2. A clear viewing screen according to claim 1, in which said ice crust breaking means comprises a cap made of heat insulating material mounted on said motor shaft, and rotatable means driven by the said motor shaft for imparting a movement to said cap with respect to said rotatable disc screen element, the outer rim of said cap being in contact with the outer surface of the said screen element.

3. A clear viewing screen according to claim 2, in which the said rotatable means comprises a cam member, a number of radial pins guided into corresponding holes formed into a part solid with the motor shaft, and a corresponding number of arms pivotably connected to the said part connected to said motor shaft.

4. A clear viewing screen as claimed in claim 1, wherein the electric heating means includes at least one annular electric heating element.

5. A clear viewing screen as claimed in claim 1, wherein the electric heating means includes concentrically disposed annular elements.

* * * * *